United States Patent
Bowe et al.

(10) Patent No.: US 7,201,883 B2
(45) Date of Patent: Apr. 10, 2007

(54) CATALYTIC REACTOR

(75) Inventors: Michael Joseph Bowe, Preston (GB); Clive Derek Lee-Tuffnell, Poole (GB)

(73) Assignee: Compactgtl PLC, London (GB)

( * ) Notice: Subject to any disclaimer, the term of this patent is extended or adjusted under 35 U.S.C. 154(b) by 121 days.

(21) Appl. No.: 10/491,782

(22) PCT Filed: Sep. 12, 2002

(86) PCT No.: PCT/GB02/04144

§ 371 (c)(1),
(2), (4) Date: Apr. 6, 2004

(87) PCT Pub. No.: WO03/033131

PCT Pub. Date: Apr. 24, 2003

(65) Prior Publication Data

US 2005/0013769 A1 Jan. 20, 2005

(30) Foreign Application Priority Data

Oct. 12, 2001 (GB) .................................. 0124513.3
Mar. 2, 2002 (GB) .................................. 0204973.2

(51) Int. Cl.
*B01J 8/02* (2006.01)
*B01J 19/24* (2006.01)
*F09D 9/00* (2006.01)
*C01B 3/38* (2006.01)

(52) U.S. Cl. .................... 422/190; 422/211; 422/222; 48/127.5; 48/127.7; 48/127.9

(58) Field of Classification Search ................ 422/211, 422/222, 190, 177, 174, 704; 518/127.9; 48/127.7, 127.5

See application file for complete search history.

(56) References Cited

U.S. PATENT DOCUMENTS

| 1,662,870 | A | | 3/1928 | Stancliffe |
| 4,214,867 | A | | 7/1980 | Hunter ........................ 432/29 |
| 5,328,359 | A | * | 7/1994 | Retallick .................... 431/326 |
| 5,342,588 | A | * | 8/1994 | Humpolik ................... 422/311 |
| 5,534,328 | A | | 7/1996 | Ashmead .................... 428/166 |
| 5,538,700 | A | | 7/1996 | Koves ........................ 422/200 |
| 5,672,629 | A | * | 9/1997 | Heil et al. ................... 518/704 |

(Continued)

FOREIGN PATENT DOCUMENTS

| DE | 3926466 | 2/1991 |
| DE | 19864361 | 8/1998 |
| DE | 19906672 | 8/2000 |

(Continued)

*Primary Examiner*—N. Bhat
(74) *Attorney, Agent, or Firm*—William H. Holt

(57) ABSTRACT

A catalytic reactor comprises a plurality of sheets defining flow channels between them. Within each flow channel is a foil of corrugated material whose surfaces are coated with catalytic material. Flow channels for a first gas extend in oblique directions relative to the flow channels for a second gas. The reactor incorporates header chambers to supply gas mixtures to the flow channels, the headers communicating with adjacent channels being separate. The reactor enables different gas mixtures to be supplied to adjacent channels, which may be at different pressures, and the corresponding chemical reactions are also different. Where one of the reactions is endothermic while the other reaction is exothermic, heat is transferred through the sheets separating the endothermic reaction. When the catalyst in one set of flow channels becomes spent, it can be replaced by removing a header.

7 Claims, 2 Drawing Sheets

U.S. PATENT DOCUMENTS

| | | | |
|---|---|---|---|
| 5,803,600 A | 9/1998 | Schubert | 366/144 |
| 5,811,062 A | 9/1998 | Wegeng | 422/129 |
| 6,200,536 B1 | 3/2001 | Tonkovich | 422/177 |
| 6,284,217 B1 | 9/2001 | Wang | 423/651 |
| 6,440,895 B1 | 8/2002 | Tonkovich | 502/439 |
| 6,451,864 B1 | 9/2002 | Wang | 518/715 |
| 6,488,838 B1 | 12/2002 | Tonkovich | 208/108 |
| 2003/0105172 A1* | 6/2003 | Bowe et al. | 518/728 |
| 2004/0237307 A1* | 12/2004 | Takahashi | 29/898.13 |
| 2005/0013769 A1* | 1/2005 | Bowe et al. | 423/652 |
| 2005/0234138 A1* | 10/2005 | Bowe | 518/726 |

FOREIGN PATENT DOCUMENTS

| | | | |
|---|---|---|---|
| EP | 0212878 | | 3/1987 |
| EP | 0885653 | * | 6/1988 |
| EP | 0292245 | | 11/1988 |
| EP | 0416710 | | 3/1991 |
| EP | 0430184 | | 6/1991 |
| EP | 0 571 056 | * | 5/1993 |
| EP | 0 724 069 | * | 7/1996 |
| EP | 0885653 | | 12/1998 |
| GB | 1490977 | | 11/1977 |
| GB | 1 531 134 | * | 11/1978 |
| GB | 1531134 | | 11/1978 |
| GB | 1 546 097 | * | 5/1979 |
| GB | 1546097 | | 5/1979 |
| WO | 98/38147 | | 9/1998 |
| WO | 01/12312 | | 2/2001 |
| WO | 01/12323 | | 2/2001 |
| WO | 01/12753 | | 2/2001 |
| WO | WO 01/54807 | * | 8/2001 |
| WO | WO 01/51194 | * | 7/2002 |
| WO | 02/064248 | | 8/2002 |
| WO | 02/066371 | | 8/2002 |
| WO | WO 03/0033132 | * | 4/2003 |

* cited by examiner

CATALYTIC REACTOR

This invention relates to a catalytic reactor suitable for use in performing gas phase reactions, and particularly but not exclusively for performing highly exothermic and endothermic reactions, and also to a chemical process using the catalytic reactor.

The use of catalytic material supported on a metal substrate is well known. For example GB 1 490 977 describes a catalyst comprising an aluminium-bearing ferritic alloy substrate, coated with a layer of a refractory oxide such as alumina, titania or zirconia, and then with a catalytic platinum-group metal. As described in GB 1 531 134 and GB 1 546 097, a catalyst body may comprise substantially flat sheets and corrugated sheets of such material arranged alternately so as to define channels through the body, either several such sheets arranged in a stack, or two such sheets wound together to form a coil. In these examples both the flat sheets and the corrugated sheets have small-scale corrugations superimposed upon them to help in the formation of the coating. Such catalyst bodies are described as being suitable for use in treating exhaust gas from vehicles. In this context heat transfer between one channel and an adjacent channel is not a consideration, as all the channels carry the same gases at the same pressures. EP 0 885 653 A (Friedrich et al) describes a compact heat exchanger for catalytic reactions in which flow channels are defined by a single long sheet of metal folded into a concertina, with corrugated foils located between successive plates of the concertina; the corrugated foils are catalyst supports and enhance heat transfer between the channels, and in one example the gases on one side of the sheet undergo an exothermic reaction while those on the other side undergo an endothermic reaction.

According to the present invention there is provided a catalytic reactor comprising a plurality of metal sheets arranged as a stack and bonded together, the sheets defining first flow channels between adjacent sheets, alternating with second flow channels between adjacent sheets, so as to ensure good thermal contact between fluids in the first and the second flow channels, the orientation of the second flow channels being different from that of the first flow channels, fluid-permeable catalyst layers being provided within at least the second flow channels, headers to supply respective fluids to the flow channels, each first header comprising a chamber attached to the outside of the stack and communicating with a plurality of first flow channels, and each second header comprising a chamber attached to the outside of the stack and communicating with a plurality of second flow channels, and such that after removal of a header the catalyst layers in the corresponding flow channels are removable.

The fluids in the channels may be gases or gas mixtures, although they may also comprise droplets of liquid as an aerosol. Where a desired reaction is exothermic, a heat transfer liquid (rather than a gas) may be passed through the other set of channels.

Preferably the catalyst layers comprise fluid-permeable metal heat transfer layers with a catalyst coating. Such metal heat-transfer layers are preferably also provided in the first flow channels. This improves heat transfer. In each case the metal heat-transfer layer may comprise a non-planar metallic foil, or a metallic foam, or a honeycomb, fibrous sheet, or mesh, or a similar structure combining ceramic and metal, for example; it must be highly permeable to the gas flow. Typically one or more corrugated or dimpled foils would be suitable. Another possibility is a sintered sheet of metal fibres, for example of porosity above 50%, provided with a catalyst coating, and which may itself be corrugated. Removal of a header exposes the open ends of the corresponding flow channels, so each catalyst layer (whatever it is made of) can be removed by sliding it lengthwise out of the flow channel through the open end.

To ensure the required good thermal contact, both the first and the second flow channels are preferably less than 8 mm deep in the direction normal to the sheets. More preferably both the first and the second flow channels are less than 5 mm deep in that direction (if the channels are defined by grooves in just one sheet, then these correspond to the depths of the grooves). To enable the plates to withstand large pressure differences between the fluids in the different flow channels, the channels are preferably no more than 50 mm wide in the direction tangential to the sheets.

Preferably the sheets are flat, with grooves machined or etched across their surfaces to define the flow channels. The reactor might therefore comprise a stack of such flat plates sufficiently thick to withstand the necessary pressure difference, the grooves in adjacent plates following different paths (which also provides structural rigidity). The grooves may be for example 20 mm wide, this width being determined by the pressure difference to which the sheet is exposed, each accommodating one or more corrugated foils of material coated with catalytic material. Bonding the plates into an integral structure ensures that the flow channels are gas tight.

Preferably the second flow channels on opposite sides of a first flow channel have mirror image flow paths. This can be achieved if adjacent first flow channels and second flow channels are in oblique directions. In one example the stack is of hexagonal shape, each flow channel extending between an opposite pair of faces. In an alternative embodiment each sheet (and therefore the stack) is rectangular, the first flow channels extending along the length of the sheets, and the second fluid follows at least two oblique paths between opposed headers.

In one use of the catalytic reactor, the gas mixture supplied to each channel is different from the gas mixture supplied to the adjacent channels, and the corresponding chemical reactions are also different. One of the reactions may be endothermic while the other reaction is exothermic. In that case heat is transferred through the wall of the sheet separating the adjacent channels, from the exothermic reaction to the endothermic reaction.

This reactor is particularly suitable for performing steam reforming of hydrocarbons (which is an endothermic reaction, generating hydrogen and carbon monoxide), and the alternate channels might contain a hydrocarbon/air mixture so that an exothermic oxidation reaction provides the necessary heat for the endothermic reforming reaction. For the oxidation reaction several different catalysts may be used, for example palladium, platinum or copper on a ceramic support; for example copper or platinum on an alumina support stabilised with lanthanum, cerium or barium, or palladium on zirconia, or more preferably platinum/palladium on a gamma alumina support. For the reforming reaction also several different catalysts may be used, for example nickel, platinum, palladium, ruthenium or rhodium, which may be used on ceramic coatings; the preferred catalyst for the reforming reaction is platinum/rhodium on alumina or stabilised alumina. The oxidation reaction may be carried out at substantially atmospheric pressure, or at an elevated pressure, while the reforming reaction may be carried out at elevated pressure, for example up to 2 MPa (20 atmospheres), more typically in the range 0 to 200 kPa above atmospheric pressure.

It will be appreciated that the materials of which the reactor are made may be subjected to a severely corrosive atmosphere in use, for example the temperature may be as high as 900° C., although more typically around 850° C. The reactor may be made of a metal such as an aluminium-bearing ferritic steel, in particular of the type known as Fecralloy (trade mark) which is iron with up to 20% chromium, 0.5–12% aluminium, and 0.1–3% yttrium. For example it might comprise iron with 15% chromium, 4% aluminium, and 0.3% yttrium. When this metal is heated in air it forms an adherent oxide coating of alumina which protects the alloy against further oxidation; this oxide layer also protects the alloy against corrosion under conditions that prevail within for example a methane oxidation reactor or a steam/methane reforming reactor. Where this metal is used as a catalyst substrate, and is coated with a ceramic layer into which a catalyst material is incorporated, the alumina oxide layer on the metal is believed to bind with the ceramic coating, so ensuring the catalytic material adheres to the metal substrate.

A problem with any catalytic reactor is that the catalyst may become less active, and hence need to be replaced. Since the reactors are designed to be suitable for use at high temperatures and pressures the plates are bonded together by a process such as diffusion bonding (which ensures gas-tight sealing), but it would be desirable to be able to reuse the bulk of the structure while being able to replace the catalysts. Furthermore co-current or counter-current flow of the two gas streams may be desirable, rather than transverse flow, to achieve a satisfactory temperature distribution; oblique flow directions of the two flow channels approximate to this.

For some purposes the catalyst metal might instead be deposited directly onto the adherent oxide coating of the metal (without any ceramic layer).

Especially if the reactor is to be used for an endothermic reaction, it may be desirable to raise the temperature of the reactor to a desired operating temperature by direct electrical heating, passing electric current through the sheets that form the reactor. This would typically only be done initially, the heat subsequently being provided by an exothermic reaction carried out in the second gas flow channels or by hot gases (for example exhaust gases from an external combustion process such as a laminar flow burner).

BRIEF DESCRIPTION OF THE DRAWINGS

The invention will now be further and more particularly described, by way of example only, and with reference to the accompanying drawings in which.

Figure 1:
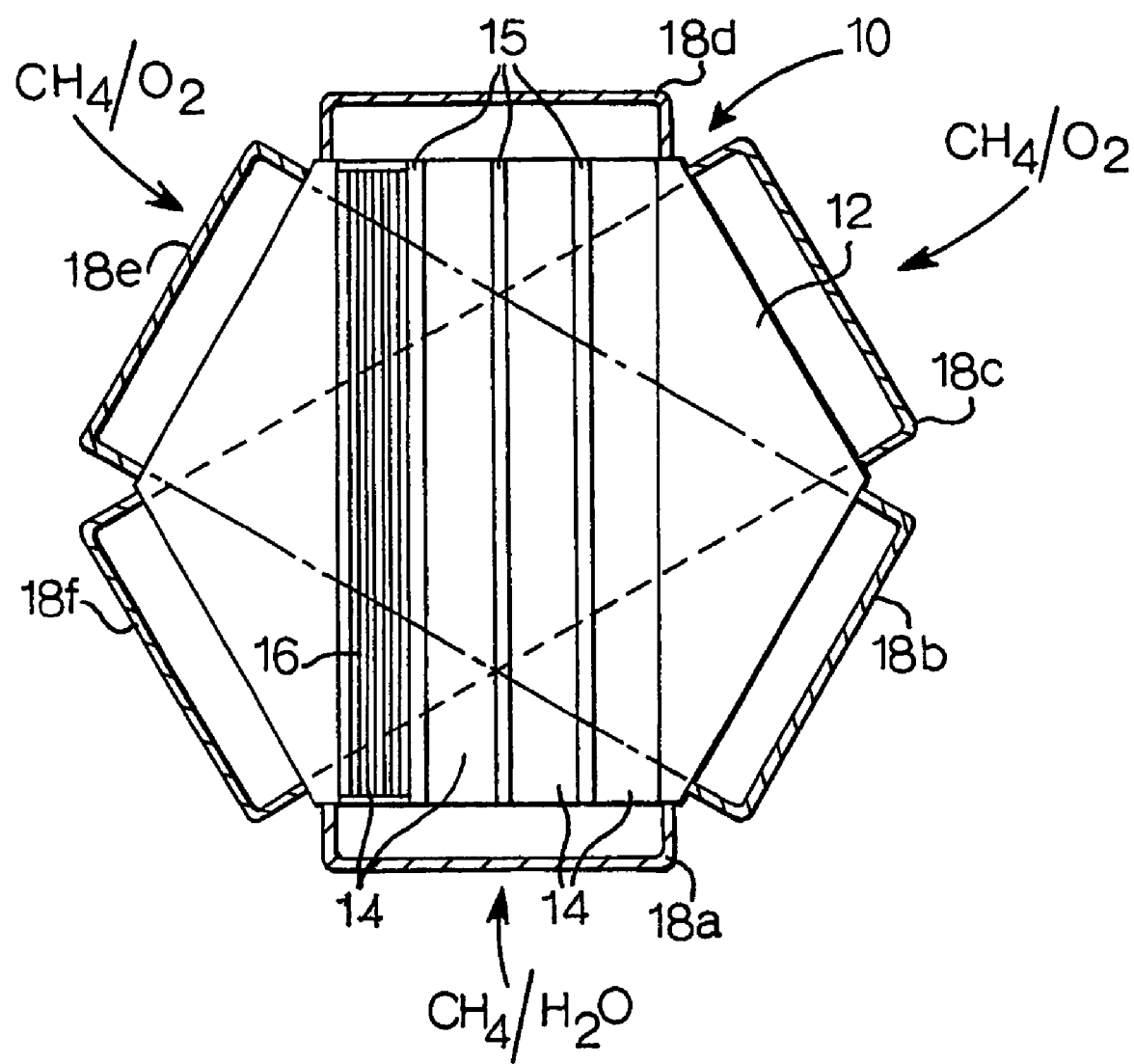
FIG. 1 shows a cross sectional view of a reactor.

Reactors of the invention may be used in a chemical process for converting methane to longer chain hydrocarbons. The first stage involves steam/methane reforming, that is to say the reaction:

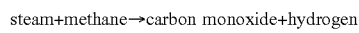
steam+methane→carbon monoxide+hydrogen

This reaction is endothermic, and may be catalysed by a platinum/rhodium catalyst in a first gas flow channel. The heat required to cause this reaction may be provided by combustion of methane, that is to say:

methane+oxygen→carbon dioxide+water which is an exothermic reaction, and may be catalysed by a platinum/palladium catalyst in an adjacent second gas flow channel. Both these reactions may take place at atmospheric pressure, although alternatively the reforming reaction might take place at an elevated pressure. The heat generated by the combustion reaction would be conducted through the metal sheet separating the adjacent channels.

The gas mixture produced by the steam/methane reforming is called synthesis gas. The hydrogen may itself be a desired product, for example for use in a fuel cell. Alternatively the gas mixture can then be used to perform a Fischer-Tropsch synthesis, that is to say:

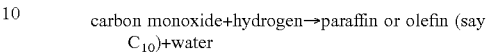
carbon monoxide+hydrogen→paraffin or olefin (say C$_{10}$)+water which is an exothermic reaction, occurring at an elevated temperature, typically between 200 and 350° C., for example 280° C., and an elevated pressure typically between 2 MPa and 4 MPa, for example 2.5 MPa, in the presence of a catalyst such as iron, cobalt or fused magnetite, with a potassium, rhenium, rhodium or yttrium promoter. The exact nature of the organic compounds formed by the reaction depends on the temperature and the catalyst, as well as the ratio of carbon monoxide to hydrogen. The heat given out by this synthesis reaction may be used to provide at least part of the heat required by the steam/methane reforming reaction, for example a heat transfer fluid such as helium or Dowtherm A or Syltherm (trade marks of Dow Chemical) may be used to transfer the heat from a reactor in which the Fischer-Tropsch synthesis is occurring, the heat being used to preheat at least one of the gas streams supplied to the reforming reactor.

For example, in the reforming step, a feed gas that consists primarily of methane with a small percentage (say 10%) of ethane and propane is heated to about 400° C., mixed with a stream of steam that is also at about 400° C. and is then supplied to a catalytic reactor. Both streams may be at atmospheric pressure, or for example at a pressure of say 100 kPa above atmospheric. The flows are preferably such that the steam: methane molar ratio is between 1:1 and 2:1. The first part of the reactor is a pre-reformer with a nickel methanation catalyst at 400° C., in which the higher alkanes react with the steam to form methane (and carbon monoxide); this pre-reformer is not required if the feed gas contains substantially no higher alkanes. The second part of the reactor is a reformer with a platinum/rhodium catalyst, in which the methane and steam react to form carbon monoxide and hydrogen. This reaction may be performed at 850° C. The heat for the endothermic reactions may be provided by combustion of methane (and/or hydrogen) over a palladium or platinum catalyst within adjacent gas flow channels, or alternatively from exhaust gases from an external combustion unit such as a laminar flow burner, the gases from the burner flowing in counter-current to the gas flow through the reformer; this can enable the reacting gases in the reformer to reach a final temperature of as much as 1000° C. Where catalytic combustion is used, the catalyst may incorporate a metal hexaaluminate (such as magnesium hexaaluminate) as the substrate, but a preferred catalyst is platinum and palladium (10% weight) on gamma alumina. The methane/oxygen mixture may be supplied in stages along the reactor, to ensure combustion occurs throughout its length.

The hot mixture of carbon monoxide and hydrogen emerging from the reformer may be used to provide heat to the steam and to the feed gas. It may then be further processed, for example being compressed and supplied to a catalytic reactor in which they react, undergoing Fischer-Tropsch synthesis to form a paraffin or similar compound. The overall result of the processes is that methane is converted to higher molecular weight hydrocarbons which are typically liquids at ambient temperatures. The desired hydrocarbons can therefore be separated from the remaining gases by cooling, so the liquids condense. The processes may be used at an oil or gas well to convert methane gas into a liquid hydrocarbon which is easier to transport.

Referring now to FIG. 1 a reactor 10 (suitable for example for steam/methane reforming) comprises a stack of plates 12 each of Fecralloy steel, each hexagonal, of side 250 mm and 3 mm thick. Grooves 14 of width 20 mm and depth 2.5 mm are machined in each plate, extending across each plate 12 from one side to the opposite side, separated by lands 15 of width 3 mm (for simplicity only four such grooves 14 and three such lands 15 are shown in the figure). A carrier foil 16 of Fecralloy steel 50 μm thick coated with a ceramic coating containing a catalyst material, and with corrugations 2.5 mm high, can be slid into each such groove 14 (only one is shown). A stack of such plates 12 is assembled, the orientation of the grooves 14 differing by 60° in successive plates 12, and is covered with a flat top plate of Fecralloy steel; the stack is then diffusion bonded together. The corrugated foils 16 are then inserted. Headers 18 are then attached to the faces of the assembled stack. Thus the gas flow channels are defined by the grooves 14; and the orientation of the plates 12 is such that the flow directions in the plates 12 above and below any one plate 12 are at 120° to each other (these grooves being indicated by broken lines and chain dotted lines respectively).

The steam/methane mixture is supplied to the header 18a, and the resulting mixture of hydrogen and carbon monoxide emerges through the header 18d. Methane/air mixture is supplied through the headers 18c and 18e (i.e. the headers on either side of the header 18d), so exhaust gas from the combustion process emerges through the headers 18b and 18f. Hence the gas flows are at least partially counter-current, so that the hottest region in the combustion channels, which is near the inlet to those channels, is closest to the outlet for the steam/methane reforming reaction.

The headers 18 each comprise a simple rectangular cap sealed around its periphery to the outside of the stack so as to cover one face of the stack. They may be welded onto the outside of the stack. Alternatively, if neither of the gas flows are at elevated pressures, it may be adequate to clamp the header chambers 18 onto the outside of the stack. In either case it will be appreciated that after a period of use, if the catalyst in either or both of the channels has become spent, then the headers 18 may be removed or cut off and the corresponding catalyst-carrying foils 16 removed and replaced. The headers 18 can then be re-attached.

It will be understood that the type of ceramic deposited on the corrugated foils 16 in the gas flow channels may be different in successive plates 12 in the stack, and that the catalyst materials may differ also. For example the ceramic might comprise alumina in one of the gas flow channels, and zirconia in the other gas flow channels. The reactor 10 formed from the plates 12 might also be suitable for performing Fischer-Tropsch synthesis. Because the plates 12 forming the stack are bonded together the gas flow channels are gas tight (apart from communication with headers 18 at each end), and the dimensions of the plates 12 and grooves 14 are such that pressures in the alternate gas flow channels may be considerably different. Furthermore the pitch or pattern of the corrugated foils 16 may vary along a reactor channel 14 to adjust catalytic activity, and hence provide for control over the temperatures or reaction rates at different points in the reactor 10. The corrugated foils 16 may also be shaped, for example with perforations, to promote mixing of the fluid within the channels 14. Furthermore parts of the foils 16 may be devoid of catalyst. In each case the corrugations preferably extend parallel to the gas flow direction.

In a modification to the reactor 10, the foils 16 are again of Fecralloy material, but the catalyst material is deposited directly onto the oxide layer of the Fecralloy.

Figure 2:
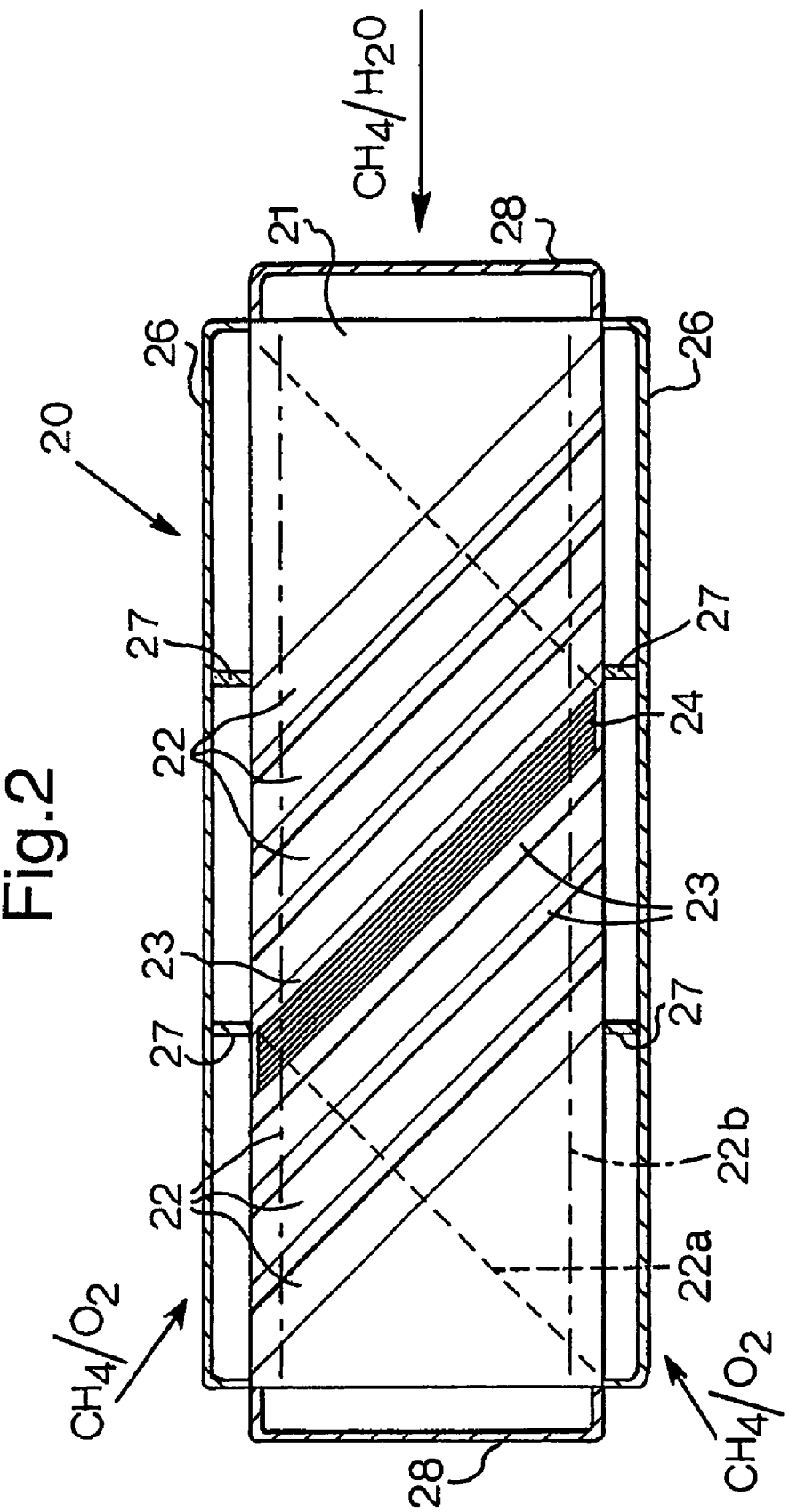
FIG. 2 shows a cross sectional view of an alternative catalytic reactor.

Referring now to FIG. 2, an alternative reactor 20 comprises a stack of Fecralloy steel plates 21, each plate being generally rectangular, 450 mm long and 150 mm wide and 3 mm thick.

On the upper surface of each such plate 21 are rectangular grooves 22 of depth 2 mm separated by lands 23 (eight such grooves being shown), but there are three different arrangements of the grooves 22. In the plate 21 shown in the drawing the grooves 22 extend diagonally at an angle of 45° to the longitudinal axis of the plate 21, from top left to bottom right as shown. In a second type of plate 21 the grooves 22a (as indicated by broken lines) follow a mirror image pattern, extending diagonally at 45° from bottom left to top right as shown. In a third type of plate 21 the grooves 22b (as indicated by chain dotted lines) extend parallel to the longitudinal axis.

The plates 21 are assembled in a stack, with each of the third type of plate 21 (with the longitudinal grooves 22b) being between a plate with diagonal grooves 22 and a plate with mirror image diagonal grooves 22a, and after assembling many plates 21 the stack is completed with a blank rectangular plate. The plates 21 are compressed together and bonded by diffusion bonding, so they are sealed to each other. Corrugated Fecralloy alloy foils 24 (only one is shown) 50 μm thick coated with a ceramic coating containing a catalyst material, of appropriate shapes and with corrugations 2 mm high, can be slid into each such groove 22, 22a and 22b.

Header chambers 26 are welded to the stack along each side, each header 26 defining three compartments by virtue of two fins 27 that are also welded to the stack. The fins 27 are one third of the way along the length of the stack from each end, and coincide with a land 23 (or a portion of the plates with no groove) in each plate 21 with diagonal grooves 22 or 22a. Gas flow headers 28 in the form of rectangular caps are then welded onto the stack at each end, communicating with the longitudinal grooves 21b. In a modification (not shown), in place of each three-compartment header 26 there might instead be three adjacent header chambers, each being a rectangular cap like the headers 28.

In use of the reactor 20 for steam/methane reforming, a steam/methane mixture is supplied to the header 28 at one end (the right hand end as shown), and the resulting mixture of hydrogen and carbon monoxide emerges through the header 28 at the other end. Methane/air mixture is supplied to the compartments of both headers 26 at the other end (the left hand end as shown), and so exhaust gas from the combustion process emerges through the compartments of both headers 26 at the right hand end as shown. The flow path for the mixture supplied to the top-left header compartment (as shown) is through the diagonal grooves 22 into the bottom-middle header compartment, and then to flow through the diagonal grooves 22a in other plates in the stack into the top-right header compartment. Hence the gas flows are at least approximately counter-current, so that the hottest region in the combustion channels, which is near the inlet to those channels, is closest to the outlet for the steam/methane reforming reaction.

In an alternative mode of use the gas flow in the longitudinal grooves 22b is in the opposite direction, so the flows are at least approximately co-current. In either case, the flow paths on either side of a plate with longitudinal grooves 22b are in mirror image oblique directions, which provides the benefit of a better temperature distribution, avoiding hot-spots.

When it is necessary to replace the catalyst, this may be done by cutting off the headers 26 and 28, and then extracting the foils 24 from all the channels defined by the grooves 22, and replacing the foils 24. The headers 26 and 28 can then be re-attached. A further benefit of this flow arrangement is that fuel for combustion may be also supplied to compartments of the headers 26 along the length of the reactor 20, which may enable a more uniform fuel/oxygen mixture to be maintained.

The plates forming the stack may be of a different size and shape, and the grooves 22 and 22A may have a different orientation. For example the plates might be 800 mm by 400 mm, and the grooves be at about 56° to the longitudinal axis (if there are three header compartments along each side), at about 63° (if there are four compartments), or at about 68° (if there are five compartments).

In a further alternative there are just two types of plate, plates with longitudinal grooves 22b alternating with plates with transverse grooves, and the baffles 27 in the two headers 26 are staggered, the baffles 27 on one side being opposite the positions midway between successive baffles 27 on the other side. The baffles 27 therefore ensure an approximation to counter-current (or co-current) flow, although they do not provide the benefits of having mirror image oblique flow paths above and below each longitudinally grooved plate.

In an alternative mode of use, the combustion takes place in an external burner (such as a laminar flow burner), the very hot exhaust gases at about 900 or 1000° C. being passed through the flow channels of the reactor 10 or 20 through which the methane/air mixture was described as flowing, in counter-current to the methane/steam flow. In this case it is not necessary to provide the foils in those channels with ceramic coating or catalyst, but the foils enhance heat transfer between the second gas flow channel carrying the hot exhaust gas and the reactants in the pre-reformer and reformer channels, by transferring heat to the separating plates 12 or 21.

In a further modification the plates that resist the pressure difference between the flow channels, e.g. the plates 12 in reactor 10 or the plates 21 in reactor 20, are of a metal such as titanium or Incalloy 800 HT that can withstand the high temperatures and the pressures and which can be readily diffusion bonded, while the foils e.g. 16 and 24, may be of Fecralloy steel if a ceramic coating (as a catalyst substrate) is required.

In the combustion channels of the catalytic reactor 14, if catalytic combustion is used to generate the heat (as indicated), the combustion catalyst may itself be coated with a thin porous inert ceramic layer, so as to restrict the contact of the gas mixture with the catalyst and so restrict the reaction rate particularly at the start of the channel.

As mentioned earlier, electrical heating by passing an electric current directly through the plates forming the reactor may be used initially to raise the temperature of the catalytic reactor to say 400° C. before supplying gases, to ensure a catalytic combustion occurs. Such electrical heating may also be used during operation to adjust the reactor temperature. Electrical heating may also be used in the vicinity of the outlet from the reactor to ensure that a temperature of say 900° C. is reached by the gases undergoing the reforming reaction.

In a modification to the reactor of FIG. 2, the plates 21 are 3.5 mm thick and the flow channels 22 are 3 mm deep and 40 mm wide. Instead of a single foil 24 there is a foil assembly consisting of two layers of corrugated Fecralloy alloy foil each of thickness 50 µm and of amplitude 1.4 mm separated by a flat foil. These foils are spot welded together, the assembly being sufficiently long to extend the entire length of the corresponding groove 22 (although alternatively there might be two such assemblies placed end to end in a groove 22).

After spot welding such an assembly it would be subjected to an oxidising treatment at 900° C. An aqueous slurry or sol (about 200 g/liter) of gamma alumina with a surface area in the range 50–200 $m^2/g$ is then applied to the surfaces of the assembly by spraying (or dipping) and drying. This process may be repeated several times to achieve a thickness of alumina in the range 50–300 µm. The alumina is then calcined. A dilute aqueous solution of platinum rhodium salt mixture is then applied by spraying and drying, repeating until the required weight loading of metal salt has been achieved. The salt is then reduced to produce finely dispersed catalyst metal on the alumina coat. (Alternatively the alumina may be dispersed in a solution of the catalyst metal salt, so both components are coated together.) The catalyst-carrying assembly can then be inserted into a flow channel 22. Typical metal loadings are in the range 5% to 25% (wt.), preferably about 10%.

Such a foil assembly as a catalyst substrate provides good metal-to-metal contact to promote heat transfer to or from the walls of the channel. Good conditions for heat and mass transfer also occur within the foil assembly, as the path length for the reacting gases to the catalyst surface is typically less than 1 mm. In the case of the steam reforming reaction, the kinetics of the reaction are intrinsically fast and kinetics are often limited by heat transfer as the reaction is strongly endothermic. The use of such a catalyst foil assembly therefore allows the reaction to proceed with high conversion efficiency (>95%) at residence times of less than 50 ms.

The catalyst foils for use in the combustion channel are assembled and processed in a similar way to that described above, although the preferred catalyst is palladium or a mixture of platinum and palladium. The metal substrate for the catalyst allows the combustion catalyst to function with a more even temperature distribution and the elimination of hot spots on the catalyst surface. Hence the catalyst can operate at 900° C. without significant deterioration of activity with time. The alumina-rich surface of the oxidised metal forms a high integrity bond with the ceramic coating.

A catalytic reactor 20 would also be suitable for performing Fischer-Tropsch synthesis. In this case the Fischer-Tropsch reaction would typically be carried out in the diagonal flow channels 22 and 22a, while the coolant would be passed through the longitudinal channels 22b. For the Fischer-Tropsch reaction the specific catalyst surface area (surface area per unit volume of channel) has to be maximized, to ensure approximately 90% conversion of the carbon monoxide in a single pass through the reactor, and at an economic residence time that would typically be in the range 1–5 s. For example a specific surface area in the range 4000–6000 $m^2/m^3$ is desirable. For this purpose each diagonal flow channel 22 and 22a would desirably be 4 mm deep and 20 mm wide, and typically in the range 0.1 to 1.0 m long. In this case a foil assembly might therefore consist of say five layers of corrugated foils of amplitude 0.75 mm with four flat foils interleaved, and as described above such an assembly may be spot welded together before being coated with ceramic and catalyst.

For example the foil assembly might be oxidised as described above, and coated with titania with a specific surface area in the range 60–300 m$^2$/g in the way described above, to achieve a coating 50–200 μm thick after sintering. A suitable catalyst for this reaction would be cobalt (say 12% to 40%) with a small proportion of a promoter such as ruthenium (0.1–1.0%) these figures being weight percent of the catalytic coating (i.e. ceramic plus catalyst metal). Other promoters include rhenium, palladium or platinum, or zirconium oxide, lanthanum oxide or thorium oxide. For example an aqueous solution of a mixed cobalt ruthenium salt might be repeatedly applied to the calcined ceramic and dried, and then reduced, to achieve a desired metal loading.

It will be appreciated that because the catalyst metal is deposited within the thin ceramic coating (say 100 μm thick) on a metal substrate, the catalyst metal must be within that distance of the surface, and therefore is readily accessible by reactants. (In contrast, with a solid ceramic substrate, the catalyst salt could diffuse much further into the ceramic.) Since the chemical reaction generates a liquid product, this liquid tends to occupy pores in the ceramic layer; this liquid restricts the access of the gases by diffusion to the catalyst sites, so if the ceramic layer were more than say 300 μm thick there would be a greater tendency for generating methane (rather than the preferred longer-chain hydrocarbons), because hydrogen diffuses faster than carbon monoxide. Another advantage of the metal foil substrate is in assisting in the removal of the reaction heat which would tend to cause hot spots. This also reduces formation of methane, as methane formation tends to increase with temperature. The catalyst is also rendered less vulnerable to deactivation by coking.

The presence of the liquid phase on the catalyst surface also reduces the overall productivity of the reactor. If, as mentioned above, the Fischer-Tropsch synthesis is performed in the diagonal channels 22 and 22a the liquid and gas phases may be separated in the headers 26 that connect the channels. This effect may be enhanced by providing a de-misting packing within the compartments of the headers 26 nearer the outlet. The liquid product would then be drained out of the base of these compartments. Within each channel the gas flows are parallel to the corrugations, so liquid tends to be entrained, minimising the build-up of liquid on the surface of the catalyst.

The dimensions of the diagonal channels 22, 22a may also be varied along the length of the reactor 20, as also may the shape of the catalyst-carrying foil assembly 24. For example the channels nearer the outlet end of the reactor may be narrower, so as to increase the linear velocity in the channel.

The catalyst layers might contain material other than metal foil. In particular there may be benefits from the use of a sheet of sintered Fecralloy fibres, such as is available from Microfiltrex, for example. In this sheet the fibres are of diameter about 5–10 μm, the structure being sufficiently open that the porosity is in the range 70–90%, and the sheet being of thickness about 0.5 mm. Such a sheet may be corrugated or pleated for use in a flow channel.

Such a sheet may be oxidised as described above, and then immersed in an alumina sol. In such a sol, for example of gamma-alumina, the nano particles form agglomerates, and these may be less than 5 μm in size, and will therefore permeate throughout the sheet, filling all the interstitial spaces. The slurry may be forced to flow through the sheet, to ensure it permeates the entire metal structure; the buildup of the alumina within the structure may be enhanced by initially laminating the metal fibre sheet with a fine paper filter medium before causing the slurry to flow through the sheet, the paper preventing the particles emerging from the fibrous metal sheet. The sheet of material is then dried, weighed, and calcined. This process may be repeated if necessary to achieve a desired weight of alumina. The catalyst (such as cobalt) would then be applied, so that it diffuses throughout the bulk of the material. The cobalt may also be combined with a promoter such as ruthenium, as described above. Hence a catalytically-active cobalt-bearing catalytic structure is provided, with a thickness of about 0.5 mm, with significant macro-porosity resulting from the interstitial spaces between the metal fibres. Those spaces may also contain particles of alumina, but nevertheless the structure allows high rates of fluid diffusion through it.

Such a catalyst layer would be particularly suitable for the Fischer-Tropsch synthesis, as the high porosity enables carbon monoxide to diffuse substantially as readily as hydrogen; despite the thickness of the layer, there would therefore not be a selectivity for methane formation. The metal fibres ensure that the catalyst layer can conduct heat, so suppressing the formation of hotspots. The metal fibres also ensure that the catalyst layer is mechanically strong. This catalyst structure may also allow a higher catalyst loading per unit volume than with the metal foils described above.

Thus the present invention also provides for the use of such a porous catalyst layer in a chemical reactor for performing a chemical reaction, in particular for performing a Fischer-Tropsch synthesis.

The invention claimed is:

1. A catalytic reactor comprising a plurality of metal sheets arranged as a stack and bonded together, the sheets defining first flow channels between adjacent sheets, alternating with second flow channels between adjacent sheets for ensuring good thermal contact between fluids in the first and the second flow channels, the orientation of the second flow channels being different from that of the first flow channels, catalyst being provided, within at least the second flow channels, exclusively in the form of fluid-permeable catalyst layers, first and second headers for supplying respective fluids to the flow channels, each first header comprising a chamber attached to the outside of said stack and communicating with a plurality of first flow channels, and each second header comprising a chamber attached to the outside of said stack and communicating with a plurality of second flow channels, wherein after removal of a header the catalyst layers in the corresponding flow channels are removable, and wherein said orientations of adjacent first and second flow channels are in oblique directions and said second flow channels on opposite sides of a first flow channel within said stack have mirror image orientations.

2. A catalytic reactor as claimed in claim 1 wherein the catalyst layers comprise fluid-permeable metal heat transfer layers with a catalyst coating.

3. A catalytic reactor as claimed in claim 2 wherein the catalyst coating is a ceramic coating comprising a catalyst.

4. A catalytic reactor as claimed in claim 2 wherein the catalyst layer comprises at least one corrugated metal foil with a ceramic coating comprising a catalyst.

5. A catalytic reactor as claimed in claim 1 wherein each sheet in the stack is of hexagonal shape, each flow channel extending between an opposite pair of faces.

6. A catalytic reactor as claimed in claim 1 wherein each sheet in the stack is rectangular, the first flow channels extending along the length of the sheets, and the second flow channels extend obliquely across respective sheets so the second fluid flow follows at least two oblique paths between opposed headers.

7. A plant for processing methane to produce longer chain hydrocarbons, the plant comprising a first catalytic reactor for performing steam/methane reforming and a second catalytic reactor for performing Fisher-Tropsch synthesis, each catalytic reactor being a catalytic reactor as claimed in claim 1; means for transferring the products of the first catalytic reactor to the second catalytic reactor, the transferring means incorporating at least one heat exchanger to remove heat from the said products and at least one compression means for increasing the pressure of the said products; and means to condense liquid components of the fluid mixture resulting from the Fisher-Tropsch synthesis.

* * * * *